United States Patent [19]

Heimbruch

[11] 4,068,014
[45] Jan. 10, 1978

[54] DEMOLDING AND BRINING OF CHEESE
[75] Inventor: Howard H. Heimbruch, Sierra Madre, Calif.
[73] Assignee: Foremost-McKesson, Inc., San Francisco, Calif.
[21] Appl. No.: 660,188
[22] Filed: Feb. 23, 1976
[51] Int. Cl.$^2$ .................. A23C 19/02; A23C 19/14
[52] U.S. Cl. .................................. 426/582; 99/452; 99/535; 426/512
[58] Field of Search ............... 426/512, 516, 518, 582; 99/452, 535

[56] References Cited

U.S. PATENT DOCUMENTS

| | | | |
|---|---|---|---|
| 3,481,747 | 12/1969 | Berge | 426/516 X |
| 3,615,587 | 10/1971 | Koopmans | 426/582 |
| 3,824,918 | 7/1974 | Bronkhorst | 99/452 |
| 3,910,174 | 10/1975 | Nelles | 99/452 |

OTHER PUBLICATIONS

Kosikowski, F., Cheese and Fermented Milk Foods, Published by the author, Cornell University, Ithaca, N.Y., 1966, pp. 153-158.

*Primary Examiner*—David M. Naff
*Attorney, Agent, or Firm*—Flehr, Hohbach, Test, Albritton & Herbert

[57] ABSTRACT

Cheese manufacturing operations of demolding and brine soaking are carried out by a method and with an apparatus wherein the operations are automated and carried out in a continuous manner starting with placing cheese molds on a conveyer on which they are moved to a demolding station where cheese is ejected from the molds, and continuing with movement of the cheese blocks from the demolding station to the brine soaking tank. These blocks are introduced into the brine soaking tank in regular rows, with the rows being advanced from one end of the tank to the other.

10 Claims, 4 Drawing Figures

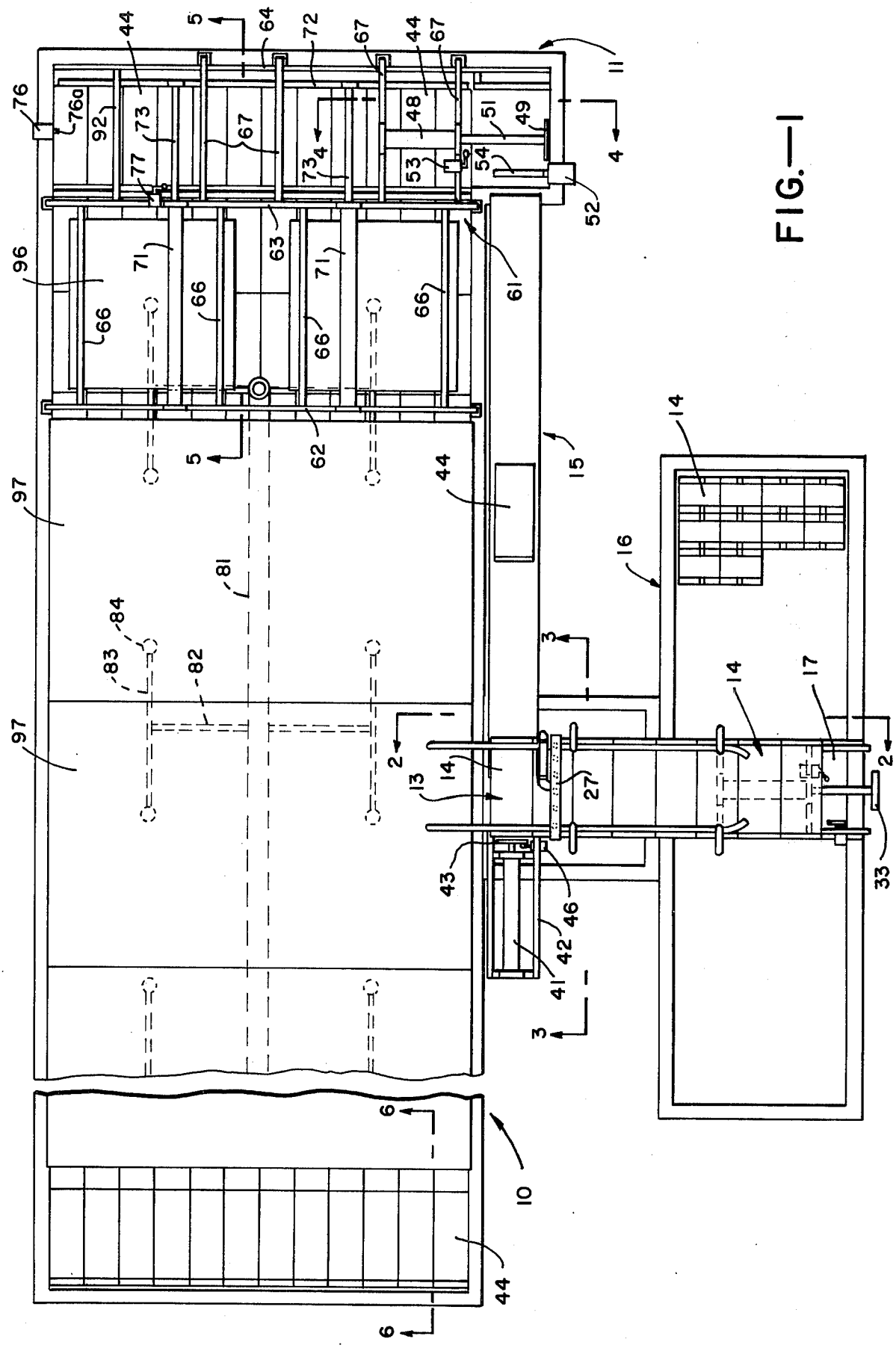
FIG.—I

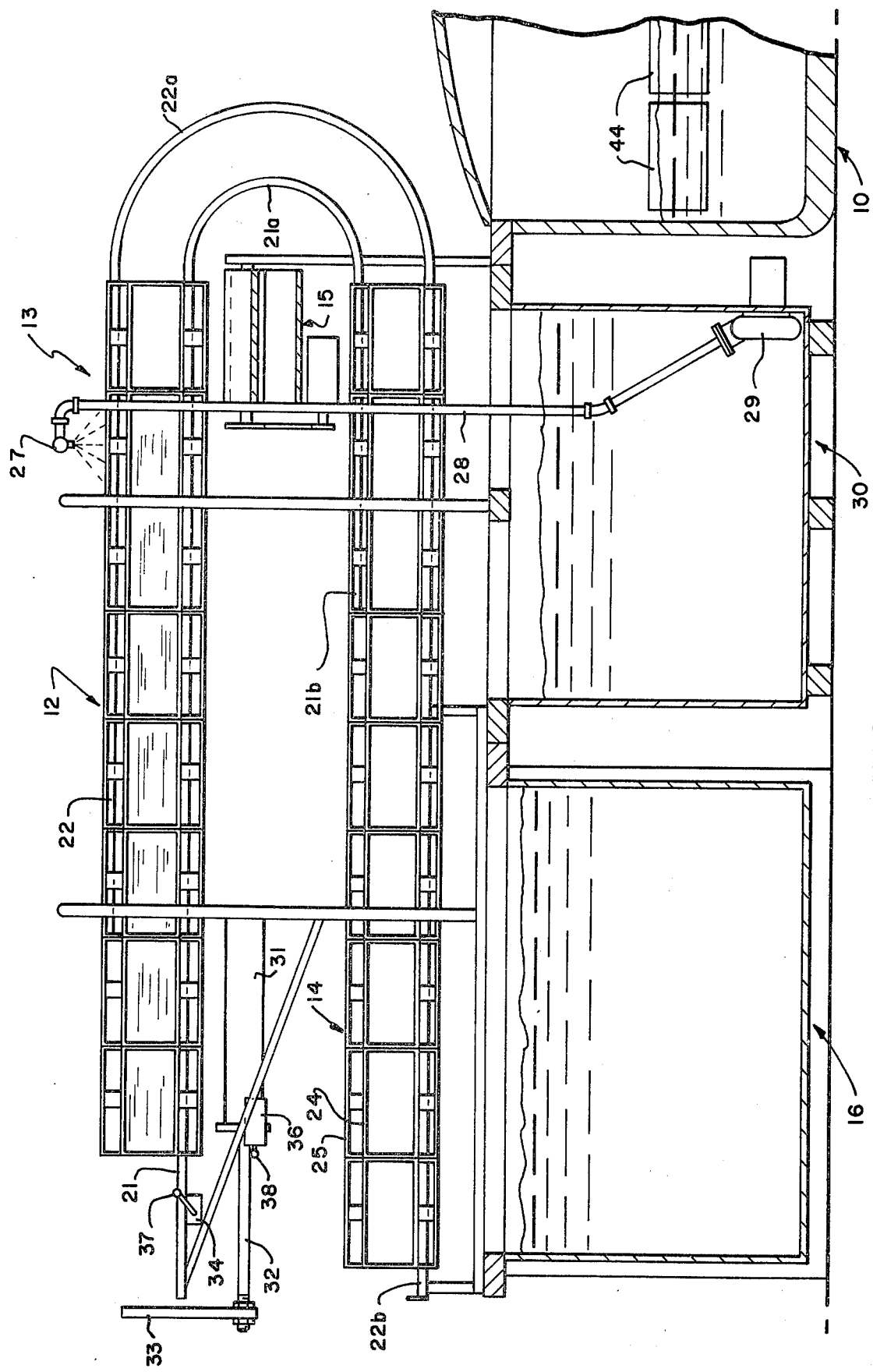
FIG.—2

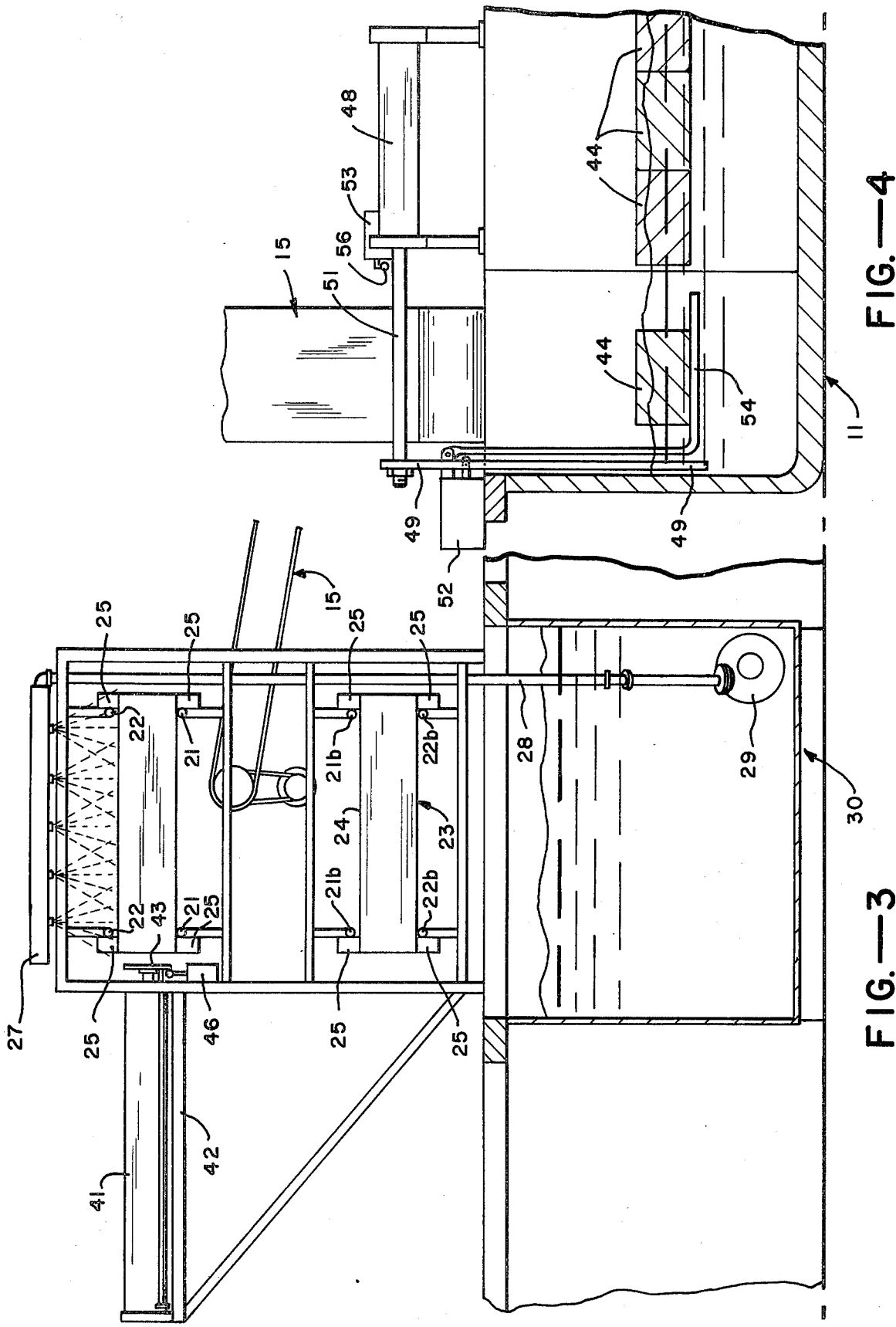

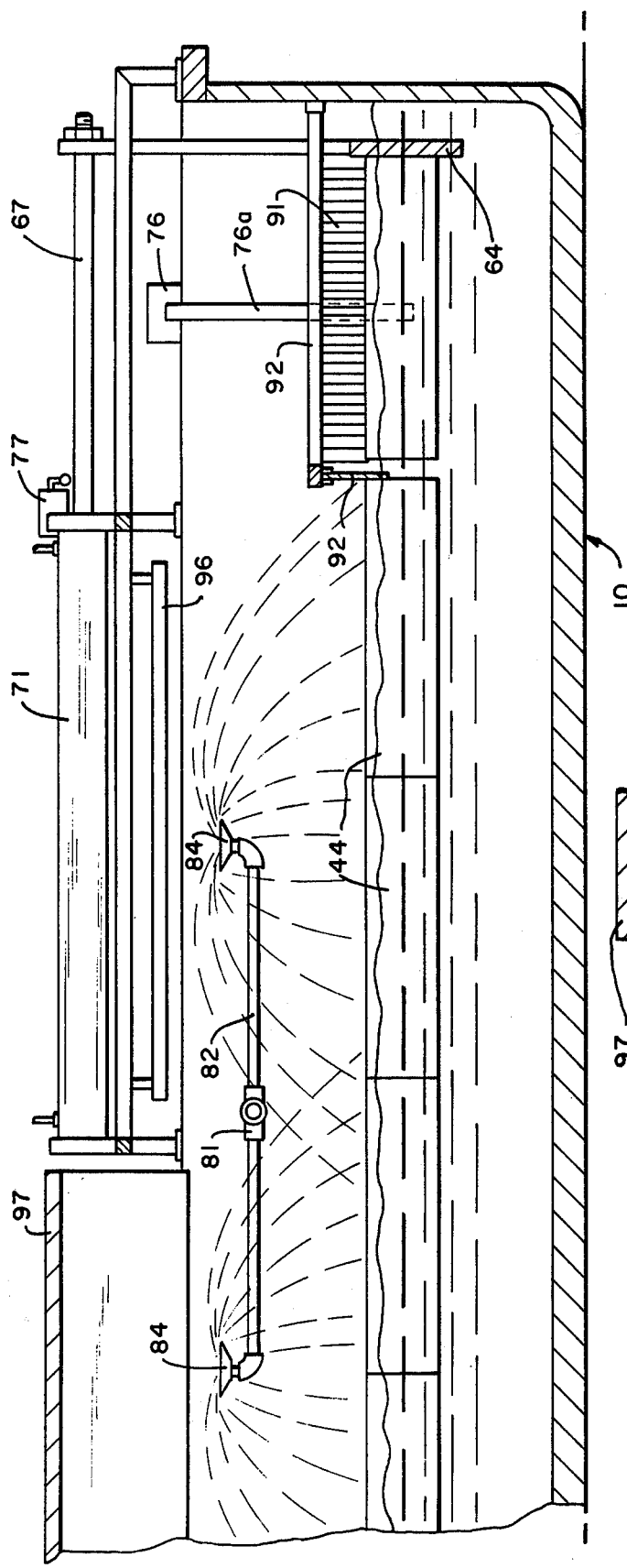
FIG.—5
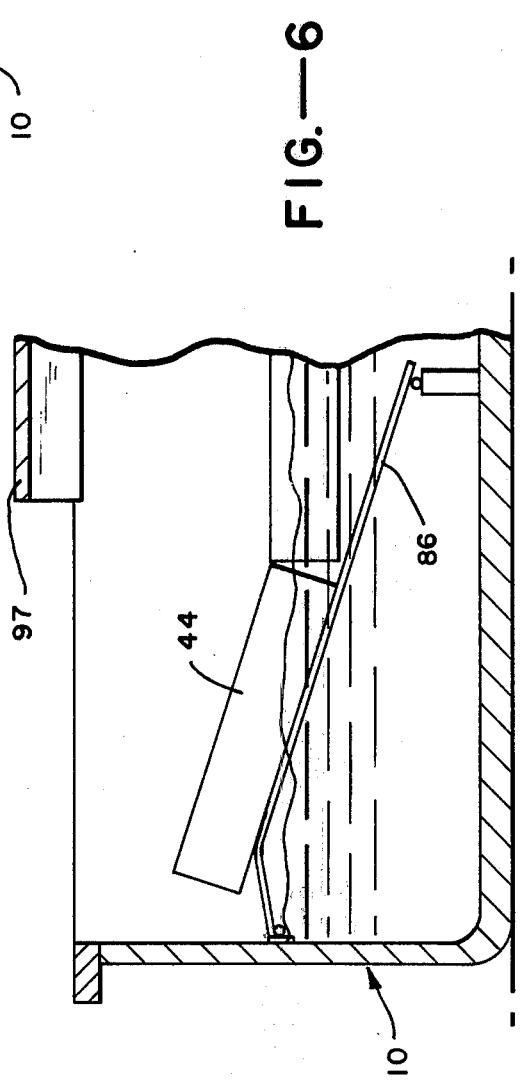
FIG.—6

DEMOLDING AND BRINING OF CHEESE

BACKGROUND OF THE INVENTION

In the manufacture of certain types of cheese, the cheese curd is formed into molded blocks or loaves which are soaked in brine, after which the blocks may be further processed, as by curing. At the time the curd is introduced into the molds, it is at an elevated temperature which is higher than that desired for brine soaking. After the molds and the contained cheese have been cooled in a chill or cooling tank, the cheese is ejected from the mold as a loaf or block and introduced into the brine tank. Brine soaking has been carried out by permitting the floating blocks to arrange themselves in an indiscriminate manner during the soaking time, which may require from 1 to 3 hours. The blocks may be turned over by hand and salt may be sprinkled on the exposed surfaces. Such conventional practice makes it difficult to maintain a continuous production schedule and involves considerable manual labor. Manual handling is inimical to good sanitary conditions.

SUMMARY OF THE INVENTION AND OBJECTS

This invention relates generally to cheese manufacturing methods and apparatus. More particularly, it pertains to methods and apparatus for carrying out demolding and brine soaking operations.

In general, it is an object of the present invention to provide a cheese manufacturing method in which operations such as demolding and brine soaking are carried out in an automated manner, with a minimum of labor and manual handling.

Another object is to provide a method and process in which cheese blocks in the brine soaking tank are introduced and advanced through the tank in an orderly fashion.

Another object is to carry out brine soaking operations in such a manner that during normal continuous operation the floating blocks are all subjected to the brine solution for a predetermined period of time.

Another object is to provide a cheese manufacturing method and apparatus in which molds containing cheese, taken from a chill tank, are moved to a demolding station where a demolding operation is carried out automatically, and in which the blocks are then moved from the demolding station to the soaking tank where they are caused to be introduced into the soaking tank in a predetermined orderly arrangement and advanced from one end of the tank to the other.

In general, according to the present method cheese blocks ejected from molds are introduced into one end of the brine soaking tank in such a manner as to form a row extending laterally of the tank. Each row after it has been formed is advanced toward the other discharge end of the tank a distance substantially equal to the width of the row. A new row of blocks is introduced into the tank immediately after the preceding row has been advanced. Before the brine soaking operation the molds are moved to a demolding station where the cheese is ejected from the molds, and the resulting cheese blocks then advanced and introduced into the brine tank. The apparatus for carrying out the method includes conveying means which moves the chilled molds to the demolding station. Means at the demolding station serves to eject the cheese from the molds. Conveying means conveys the cheese blocks from the demolding station to one portion of the brine tank. The tank is provided with means for receiving the molds from the last mentioned conveyer and for introducing them successively into one end of the tank. The brine tank is provided with means for advancing the rows in a regular cyclic manner.

Additional features and objects of the invention will appear from the following description in which the preferred embodiment has been set forth in detail in conjunction with the accompanying drawing.

BRIEF DESCRIPTION OF THE DRAWING

FIG. 1 is a plan view illustrating apparatus incorporating the invention.

FIG. 2 is a cross-sectional view taken along the line 2—2 of FIG. 1.

FIG. 3 is a cross-sectional view taken along the line 3—3 of FIG. 1.

FIG. 4 is a cross-sectional view taken along the line 4—4 of FIG. 1.

FIG. 5 is a cross-sectional view taken along the line 5—5 of FIG. 1.

FIG. 6 is a cross-sectional view taken along the line 6—6 of FIG. 1.

DESCRIPTION OF THE PREFERRED EMBODIMENT

Referring to FIG. 1, the apparatus consists of a brine soaking tank 10 which is generally rectangular in plan and which is proportioned to contain brine solution to a sufficient depth to float the cheese blocks. The right-hand portion of the tank 10 receives the cheese blocks, while the blocks are removed at the left-hand discharge end. The right-hand end of the tank is shown provided with a corner tank extension 11 into which the blocks are received and from which they are moved into the main part of the tank. Conveying means 12 serves to move the molds containing cheese, step by step, to the demolding station 13. From the demolding station 13 the blocks are moved by conveyer 15 and introduced into the tank extension 11. The molds 14 are taken from the chill tank 16 and positioned at the receiving station 17 of the conveyer 12. At this station means is provided for advancing the molds along conveyer 12 to the demolding station 13 where means is provided for automatically carrying out demolding. In conjunction with the tank extension 11, means is provided for advancing the cheese blocks received from the conveyer 12 into the main part of the tank. At the right-hand end of the tank as viewed in FIG. 1, means is provided for advancing a complete row of cheese blocks toward the other discharge end of the tank.

Referring to FIG. 2, the conveyer means 12 consists of parallel track forming members 21 which extend horizontally from a position underlying the station 17 to a position adjacent one side of the brine soaking tank 10. The upper horizontal portions of members 21 merge with the looped portions 21a and the lower horizontal extensions 21b. Extending parallel but spaced from the members 21 there are like members 22 which merge with looped portions 22a and lower extensions 22b which terminate at the front wall of the chill tank 16 where the molds are manually removed. Suitable cheese molds 14 are shown in FIGS. 2 and 3. Each mold consists of a box-like main body 24 which is rectangular in cross-section and which has members 25 secured to the ends of the side walls, thereby forming the effect of ears that are adapted to engage the guide rods of the conveyer. This serves to retain the molds in a desired position extending laterally of the conveyer.

Intermediate the receiving station 17 and the demolding station 13 the molds are subjected to a spray of hot water for the purpose of facilitating the demolding operation. Thus a spray nozzle 27 is disposed above the conveyer 12 adjacent the demolding station 13, and is connected by pipe 28 to the discharge side of pump 29. This pump is immersed in the hot water tank 30 whereby it receives hot water from the tank and discharges it as a spray from the nozzle 27. Water draining from the molds drops back into the tank 30.

The means at the receiving station 17 for advancing each mold as it is received consists of pneumatic operator 31, preferably of the double acting cylinder-piston type. A pusher plate 33 is attached to the operating rod 32 of the operator 31, and is arranged to move between the guide members 21. As is well known to those familiar with pneumatic operators of the cylinder-piston type, it is energized by introducing air under pressure to one end of the cylinder, with the other end of the cylinder being vented. Control valves 34 and 36 are connected in the piping connections from the source of air supply to the cylinder of the operator 31, whereby valve 34 controls movement of the pusher member 33 toward the right as viewed in FIG. 2, and valve 36 controls movement of the pusher back to its initial position. Valve 34 has its operating lever or finger 37 located whereby it is depressed to open the valve 34 when a mold is placed in the receiving station 17. Valve 36 has its operating finger or lever 38 located whereby when the pusher 33 reaches the end of its stroke toward the right as viewed in FIG. 2, it engages the finger 38, thus causing the pneumatic operator to be reversed to return the pusher 33 back to its initial position. The stroke of the pusher 33 is slightly greater than the width of each mold.

As each mold reaches the demolding station 13, it is in alignment with the conveyer 15. The demolding means at the station 13 preferably makes use of a pneumatic operator 41 of the double acting cylinder-piston type. This is mounted in a horizontal position and is carried by a suitable frame 42. The operator 41 carries a pusher plate 43 which has a configuration similar to the rectangular configuration of the interior of the mold, but of such dimensions that it can be pushed through the body of the mold to eject the cheese. When a mold 14 reaches the station 13, the pneumatic operator 41 is energized to carry out a stroke cycle whereby a cheese block 44 is ejected and caused to fall upon the conveyer 15. A control valve 46 is associated with the air supply to the operator 41, and has its operating finger disposed to be engaged by the pusher 43 upon its return stroke. Forward movement of the pusher 43 can be controlled by the same valve 36 as is employed for the pusher 33. This provides a type of interlock which ensures operation of the member 43 only at the end of a stroke of the pusher 33.

As shown in FIGS. 1 and 3, the conveyer 15 is of the endless belt type and is driven continuously at a sufficient speed to convey the cheese blocks 44 from the demolding station with a substantial spacing between successive blocks. The conveyer 15 terminates adjacent the extension 11 whereby as the blocks are discharged they are dropped into the extension and into the brine.

Means are provided in conjunction with the tank extension 11 whereby when the cheese block is received from the conveyer 15 it is moved laterally into the main portion of the tank. This means consists of a pneumatic operator of the double acting cylinder-piston type. A pusher 49 is attached to the operating rod 51 and extends downwardly into the tank extension 11. The lower end normally extends below the level of the brine solution. Control valves 52 and 53 are connected in the air supply to the operator 48, and are arranged to energize the operator to move the pusher 49 to the right as shown in FIG. 4 and then to return the same back to its initial position. Valve 52 is operated by depression of an L-shaped lever 54 which is engaged by a cheese block 44 delivered into the extension 11. Valve 53 is operated at the end of the stroke of the pusher 49 when it engages the member 56 of valve 53. As indicated in FIG. 4, one stroke of the pusher 49 serves to move a floating block 44 from the extension 11 into the main part of the brine tank.

As shown in FIG. 1, a frame 61 is carried by the upper edge of the tank walls and extends over the right-hand end portion of the tank as shown in FIG. 1. The frame includes the laterally extending members 62 and 63, which have their ends carried by the side walls of the tank. Also a laterally extending member 64 is disposed adjacent the tank end wall. The longitudinal members 66 have their ends attached to members 62 and 63, and longitudinally extending members 67 have their ends attached to the members 63 and 64. This frame serves to carry the operators 71 which likewise are preferably of the pneumatic double-acting cylinder-piston type. A pusher member 72 extends laterally of the tank and is dimensioned whereby its lower portion extends into the brine. It is secured to the operating rods 73 of the operators 71. Valves 76 and 77 are connected in the pneumatic connections to the operators 71, and serve to cause the pusher 72 to start a stroke cycle when a complete row of cheese blocks has been introduced into the tank. More specifically, when the first block of a row of cheese blocks in the right hand end of the brine tank as viewed in FIG. 1 engages the operating member 76a of the valve 76, the operators 71 are energized whereby the pusher 72 moves from the position shown in FIG. 1 toward the left and toward the other discharge end of the tank.

It will be evident that when a row of cheese blocks has been completed adjacent the pusher 64 and extending across the receiving end of the tank, a stroke cycle of the pusher 64 serves to move the row of blocks toward the other end of the tank a distance substantially equal to the width of the row. The space just vacated by the row then receives the next row of blocks. As the rows are advanced toward the discharge end of the tank, they remain substantially intact whereby each block remains within the tank for a predetermined period of time, namely the time required for its intermittent movement from the receiving end of the tank to the discharge end. In a typical instance this time may be of the order of 1 to 3 hours, depending upon the rate with which the cheese blocks are supplied to the conveyer 15.

During movement of the rows of blocks from the receiving to the discharge end of the brine tank, it is desirable to spray the upper surfaces of the floating blocks with brine solution. Thus the manifold pipe 81 shown in FIG. 1 is connected with the branch pipes 82 and 83, which are provided with spray nozzles 84. As shown in FIG. 5, the nozzles 84 discharge brine spray upwardly whereby an umbrella like spray falls upon the upper surfaces of the blocks. A suitable brine circulating pump (not shown) is connected by piping to take the brine from the tank 10 and discharge it into the manifold 81.

The discharge end of the brine tank is illustrated in FIG. 6. It is provided with a ramp 86 which slopes upwardly toward the end wall of the tank whereby cheese blocks 44 reaching this ramp and being moved forward by the following blocks are raised above the level of the brine solution, thus facilitating manual removal.

It is desirable to provide means in the receiving end of the tank which serves to retain the incoming row of blocks as a regular row, or in other words, with the blocks in close side-by-side proximity with each other and adjacent to the pusher 72. For this purpose, a plurality of curtains 91 formed by depending fingers are carried by support means 92, and extend downwardly over the underlying blocks. These curtains are located at spaced positions across the brine tank, one position being between the extension 11 and the main part of the tank. This provides more restraint against advancing movement of the blocks, whereby the blocks are maintained in close side-by-side proximity with each other. In addition, a flexible curtain 92 is provided which extends downwardly across the tank and serves to maintain the first row of blocks within a prescribed area until advanced toward the discharge end of the tank by the pusher 72.

It is desirable to provide a covering for the brine tank which extends over the spray nozzles 84. Thus covering sheets 96 can be carried by the support members 66. Also covering sheets 97 are shown extending over the remaining part of the tank, except for the discharge end.

Overall operation of the apparatus and the method involved are as follows. In the preceding processing operations the molds are filled with cheese curd, and the molds then introduced into the chill tank 16. They are taken one by one from the chill tank and placed upon the conveying means 12 at the receiving station 17. This trips the pneumatic valve 34, causing the operator 31 to move the pusher 33 to the right as viewed in FIG. 2, whereby the mold is advanced along the conveyer track. The advancing row of molds passes under the spray 27 which serves to heat the mold to facilitate removal of the cheese. When a mold arrives at the demolding station 13, it is automatically aligned with the pusher 43, and the operator 41 then moves the pusher 43, through the mold to eject the cheese block. The block falls upon the endless coveyer 15 which moves the block toward the tank extension 11 (FIG. 1). When the block reaches the end of the conveyer 15, it is dropped into the brine within the extension 11 to trip the valve 52 and thus cause the pusher 49 to move the block into the main part of the tank. As successive blocks are demolded and advanced into the receiving end of the tank, a row is formed which eventually trips the valve 76 as it is completed. This serves to energize the operators 71 which move the pusher 72 to transpose the row of blocks past the curtain 92 and into a position adjacent the curtain, as shown in FIG. 5. Eventually in normal operation a plurality of rows of floating cheese blocks extend laterally of the tank, with brine being sprayed on their upper surfaces. When the tank is filled with the rows of blocks, each operation of the pusher 64 to move a row past the curtain 92 serves to deliver a row of blocks at the discharge end of the tank upon the ramp 86, where the row is removed.

The advantages of the invention will be evident from the above. The amount of manual labor is minimized and the operations are carried out in such a manner as to speed up the total operation and improve sanitation.

Reference has been made to the various pneumatic operators and their control valves. Suitable equipment of this type is well known to those familiar with systems making use of reciprocating operators controlled to carry out a stroke cycle. Such pneumatic equipment, including pneumatic operators of the double acting cylinder - piston type with control valves, is manufactured and sold by Modern Air Corporation of Angola, Indiana.

I claim:

1. In a cheese processing method in which blocks of cheese after being removed from molds are soaked in brine solution in a brine soaking tank, the steps of introducing a first row of cheese blocks into one end of the tank by sequentially introducing single blocks into the tank at one corner of the same and moving successive blocks laterally of the tank to form a free floating horizontal row extending laterally across the tank, moving the row after it is completed toward the other end of the tank for a distance comparable to the width of the row, introducing a second free floating horizontal row of cheese blocks into said one end of the tank at said one corner, moving both the first and second rows toward the other end of the tank for a distance comparable to the width of each row after the second row is completed, and then repeating successive introduction of rows of cheese blocks into the tank at said one corner and causing movement of the same toward the other end of the tank whereby the first row of cheese blocks eventually reaches the other end of the tank, and then removing said first row from the tank.

2. A method as in claim 1 in which the cheese blocks as they are being introduced successively into said one end of the tank are restrained against movement toward the other end of the tank until a row is completed.

3. In a cheese processing method applicable to blocks of cheese within molds, the steps of supplying the molds with the cheese therein to conveying means, causing the molds to progress step by step to a demolding station, expelling cheese blocks from the molds at the demolding station, conveying the expelled cheese blocks from the demolding station to one end of a brine soaking tank, the tank having a corner extension at said one end, successively moving the blocks from the corner extension into the adjacent end of the tank, successively introducing the conveyed blocks one by one into the corner extension of the brine soaking tank to form a first horizontal free floating row of cheese blocks extending laterally across the tank, moving the row after it is completed toward the other end of the tank for a distance comparable to the width of the row, introducing a second free floating horizontal row of cheese blocks into said one end of the tank at said one corner, moving both the first and second rows toward the other end of the tank for a distance comparable to the width of each row after the second row is completed, and then repeating successive introduction of rows of cheese blocks into the tank at said one corner and causing movement of the same toward the other end of the tank whereby the first row of cheese blocks eventually reaches the other end of the tank, and then removing said first row from the tank.

4. A method as in claim 3 in which the cheese blocks as they are being introduced into said one end of the tank are restrained against movement toward the other end of the tank until a row of blocks is completed.

5. In apparatus for the processing of cheese, a brine soaking tank having a receiving end, an opposite discharge end, and a corner extension at the receiving end, means for successively introducing cheese blocks into the corner extension, means at the corner extension for successively moving the blocks from the same into the receiving end of the tank to form free floating horizontal rows of blocks extending laterally of the tank, reciprocating pusher means for moving each row of cheese blocks after it is formed toward the discharge end of the tank for a distance comparable to the width of each row whereby a space is formed for receiving a next row of blocks from said corner extension.

6. Apparatus as in claim 5 in which means is provided in the receiving end of the tank to restrain the blocks as a row therein, before the complete row is moved toward the discharge end by said reciprocating pusher means.

7. Apparatus as in claim 5 together with means forming a demolding station, means at said station to eject cheese blocks from the molds, and conveyer means for moving the blocks from said demolding station and to deliver the same one by one into said tank extension.

8. Apparatus as in claim 5 together with means within the corner extension to receive and support blocks of cheese introduced into the same, and means responsive to a block being received by said last means for activating the means for engaging the blocks in the extension for successively moving the blocks from the extension into the tank.

9. Apparatus as in claim 5 together with upwardly sloping ramp means at the discharge end of the tank for raising a row of blocks moved upon the same.

10. Apparatus as in claim 6 in which the restraining means consists of curtain means extending laterally across the tank, and a pusher member extending laterally across the tank at said one end of the same, the pusher member being a part of said means for moving each row of blocks after it is completed, the curtain means and the pusher member being parallel and spaced apart to accommodate and restrain a row of blocks, the curtain means permitting a complete row of blocks to be moved past the same into the main portion of the tank.

* * * * *